United States Patent
Den Brinker et al.

(10) Patent No.: US 9,218,576 B2
(45) Date of Patent: Dec. 22, 2015

(54) METHOD SILHOUETTE IMAGE REPRESENTATION

(75) Inventors: Albertus Cornelius Den Brinker, Eindhoven (NL); Werner Paulus Josephus De Bruijn, Eindhoven (NL)

(73) Assignee: KONINLKIJKE PHILIPS N.V., Eindhoven (NL)

( * ) Notice: Subject to any disclaimer, the term of this patent is extended or adjusted under 35 U.S.C. 154(b) by 217 days.

(21) Appl. No.: 13/133,005

(22) PCT Filed: Dec. 4, 2009

(86) PCT No.: PCT/IB2009/055497
§ 371 (c)(1),
(2), (4) Date: Jun. 6, 2011

(87) PCT Pub. No.: WO2010/067280
PCT Pub. Date: Jun. 17, 2010

(65) Prior Publication Data
US 2011/0238757 A1    Sep. 29, 2011

(30) Foreign Application Priority Data

Dec. 11, 2008  (EP) .................................... 08171328

(51) Int. Cl.
*G06F 15/16*  (2006.01)
*G06Q 10/00*  (2012.01)
*G06F 17/30*  (2006.01)

(52) U.S. Cl.
CPC ............ *G06Q 10/00* (2013.01); *G06F 17/3087* (2013.01); *G06F 17/30256* (2013.01)

(58) Field of Classification Search
CPC .... G06Q 10/00; G06Q 10/10; G06F 17/3087; G06F 17/30256
USPC ................................. 709/216, 218, 224, 223
See application file for complete search history.

(56) References Cited

U.S. PATENT DOCUMENTS

| | | | |
|---|---|---|---|
| 2007/0070069 A1* | 3/2007 | Samarasekera et al. ...... | 345/427 |
| 2007/0208513 A1 | 9/2007 | Hillman | |
| 2008/0134063 A1* | 6/2008 | Volach .......................... | 715/762 |
| 2008/0250464 A1* | 10/2008 | Masucci et al. .................. | 725/82 |
| 2008/0291205 A1* | 11/2008 | Rasmussen et al. .......... | 345/441 |
| 2009/0024963 A1* | 1/2009 | Lindley et al. ................ | 715/839 |

(Continued)

FOREIGN PATENT DOCUMENTS

| | | |
|---|---|---|
| JP | 2003108793 | 4/2003 |
| JP | 2005258755 | 9/2005 |

(Continued)

OTHER PUBLICATIONS

Statement in Accordance With the Notice From the European Patent Office Dated Oct. 1, 2007 Concerning Business Methods-PCT; Amtsblatt EPA/Official Journal EPO/Journal Officiel OEB, November 2007, pp. 592-593.

(Continued)

*Primary Examiner* — Dhairya A Patel

(57) ABSTRACT

This invention relates to a method and a system of silhouette image representation of a subject located at a remote location. Input data relating to the remote location are received, one or more graphical indicator indicating graphically at least one local condition at the remote location is obtained based on the received input data, and the one or more graphical indicators are incorporated in the silhouette image.

12 Claims, 3 Drawing Sheets

(56) References Cited

U.S. PATENT DOCUMENTS

| | | | |
|---|---|---|---|
| 2009/0125376 A1* | 5/2009 | Sundaresan et al. | 705/10 |
| 2009/0249359 A1* | 10/2009 | Caunter et al. | 719/315 |
| 2009/0254801 A1* | 10/2009 | Pressman et al. | 715/205 |
| 2009/0273560 A1* | 11/2009 | Kalanithi et al. | 345/156 |
| 2010/0110105 A1* | 5/2010 | Kinnunen et al. | 345/629 |
| 2011/0035054 A1* | 2/2011 | Gal et al. | 700/258 |

FOREIGN PATENT DOCUMENTS

| | | |
|---|---|---|
| JP | 2006513669 A | 4/2006 |
| WO | 2004068856 A1 | 8/2004 |

OTHER PUBLICATIONS

Apperley et al: "Use of Video Shadow for Small Group Interaction Awareness on a Large Interactive Display Surface"; Australian Computer Society, Inc., 2002, 10 Page Document.

Claus J.S. Knudsen: "Presence Production"; Thesis, Royal Insititute of Technology, Sep. 2004, 78 Page Document.

Levin et al: "Sounds From Shapes: Audiovisual Performance With Hand Silhouette Contours in the Manual Input Sessions"; Proceedings of the 2005 International Conference on New Interfaces for Musical Expression (NIME05), pp. 115-120.

Anonymous: "Myron Krueger"; Article on Human-Computer Interaction, Downloaded From file://C:\DOCUME-1\ING013-1.COD\LOCALS-1\Temp\G92CDCV7.htm on Feb. 21, 2008, 9 Page Document.

Wilson et al: "Play Together: Playing Games Across Multiple Interactive Tabletops"; Microsoft Research, 2007, 4 Page Document.

* cited by examiner

METHOD SILHOUETTE IMAGE REPRESENTATION

FIELD OF THE INVENTION

The present invention relates to a method and a system for silhouette image representation of a subject located at a remote location.

BACKGROUND OF THE INVENTION

When loved ones, friends or relatives are travelling far away from home, there is often a need for somehow feeling somewhat closer to that person. The shadow theatre has been proposed as a way to stay in touch and can be characterized as persistent yet non-obtrusive, where the silhouette of a remote person is displayed, possibly in a spot light, where the spotlight's colour can act as cue or indicator of a certain status or mood.

BRIEF DESCRIPTION OF THE INVENTION

The object of the present invention is to improve prior art shadow theatre displays with the aim of making the silhouette image more characteristic for the environment in which the remote person is staying.

According to one aspect the present invention relates to a method of silhouette image representation of a subject located at a remote location, comprising:
  receiving input data relating to the remote location,
  obtaining at least one graphical indicator indicating graphically at least one local condition at the remote location based on the received input data, and
  incorporating the at least one graphical indicator in the silhouette image.

Thus, additional information are provided concerning the remote location in which the remote person is staying, which when incorporated into the silhouette image create constant awareness of his/hers situation. As this immerses the viewer into the environment in the sense that he/she is constantly aware of it when watching the shadow theatre, this adds to the sense of being closer to the person. An example of such environment changes when somebody is far from home are the time, the weather and the landscape. All of these can now be incorporated in the shadow theatre and be rendered in such a way as to be in line with the concept of the shadow theatre, namely persistent and non-obtrusive, and can be directly mediated as a kind of feeling rather than knowledge-based information. In this way, the idea is not to render a virtual view of the actual location of the other person as this would push the perception of closeness created by the shadow theatre to the background due to the overwhelming amount of information relative to a silhouette.

Also, the fact that a graphical indicator is being displayed in conjunction with the silhouette image instead of a real image (digital image) means that no additional processing power is required at the user's local side that would otherwise be required.

In one embodiment, the received input data include one or more data selected from:
  the time at a local user's side,
  the time at the remote location side,
  data indicating the actual date, and
  geographical data of the remote location.

In one embodiment, the step of obtaining at least one graphical indicator is performed at the local user's side where said data is used as an input in creating said at least one graphical indicator.

Thus the method does not rely on any external input data other than a "one-time" input by the user. This very simple implementation relates to the fact that, in many cases, just having a simple indication of the time-of-day at the location of a remote loved one, the user can already invoke some elementary form of feeling a little bit closer. As an example, the sun/moon dial or lighting characteristic and the like graphical indicator may be provided which may be incorporated into the silhouette image based on only the local time at the remote person's location. This local time of the remote location may be kept by means of an internal clock that is once set by the user. Alternatively, the user once enters a time-offset for the remote friend's location relative to his own local time. Or, the user may once enter his location and his remote friend's location, after which the system determines the time difference from e.g. a simple look-up table. By including the date it is possible to adapt the time-of-day graphical indicator to the date so that e.g. in winter the graphical indicator (e.g. sun/moon) gets light later and gets dark earlier.

In one embodiment, the step of creating said at least one graphical indicator is based on a set of rules which links the data relating to the remote location to the graphical indicator to be displayed.

In one embodiment, said set of rules is a look-up table which links the data relating to the remote location to the graphical indicator to be displayed.

In one embodiment, the set of rules is a mathematical rule which uses the received input data as an input variable where the output of the mathematical rule is the at least one graphical indicator to be displayed. Accordingly, in e.g. the case of the time-of-day indicator, it is easy to make a mathematical rule (formula) that e.g. links the position of the sun to the time.

In one embodiment, the at least one graphical indicator comprises a circular-shaped icon indicating the sun or the moon and a horizontal line indicating the horizon, wherein the look-up table associates the time of the remote location to the position of the circular-shaped icon so as to animate the sun rising above the horizon within the silhouette image area.

In one embodiment, the step of obtaining the at least one graphical indicator comprises:
  requesting external service agents for condition related data for the remote location, and
  converting the condition related data into said at least one graphical indicator.

In one embodiment, the external service agents are selected from:
  a weather service agent which supplies weather related information at the remote location or which supplies said graphical indicator indicating graphically the weather related information, or
  a finance service agent which supplies finance related information at the remote location or which supplies said graphical indicator indicating graphically the financial situation at the remote location, or
  a social service agent which supplies social related information at the remote location or which supplies said graphical indicator indicating graphically the social situation at the remote location.

In one embodiment, the data relating to the remote location is issued by remote service agents as a response to an input command received from the user, where the input command includes data identifying the remote location. Such data identifying the remote location may e.g. include the name of the country/city of the remote location, country/city codes of the remote location, or any type of geographical data. These data are then transmitted to e.g. a weather station which, based on the received data, issues the data relating to the remote location, which in this case would be a weather related data. The converting step may be performed at the weather station so that the user's local side receives the graphical indicator, or the converting step may be performed at the user's local side. Accordingly, in this embodiment the user may request various servers for said data relating to the remote location or for said at least one graphical indicator (e.g. image showing whether it is cloudy or clear sky or raining or not raining etc).

In one embodiment, the data relating to the remote location is issued by remote service agents as a response to a requesting command from the user requesting to display the silhouette image or when starting a software program containing such a silhouette image. Accordingly, the command is issued automatically when the user requests the silhouette to be displayed. By doing so, the selection of the silhouette would include data about the location of the remote subject (the silhouette image), i.e. where the remote person is currently located. These data (location data) would then be used to by the remote service agents to obtain the data relating to the remote location or the appropriate graphical indicator.

In one embodiment, the step of incorporating the at least one graphical indicator in the silhouette image includes adding the at least one graphical indicator onto an existing silhouette image which acts as a background image. This would be the scenario where the graphical indicator is simply added to an existing silhouette image, instead of creating a new silhouette image comprising the at least one graphical indicator.

In one embodiment, the step of incorporating the at least one graphical indicator in the silhouette image includes generating a silhouette image comprising the at least one graphical indicator.

In one embodiment, the at least one graphical indicator is received at the user's local side as a separate data stream. This means that e.g. the graphical indicator is not transmitted as an integral part of the silhouette but separately. This allows the user also to decide whether to include the graphical indicator in the silhouette image or not.

In one embodiment, the method further comprises receiving a command from the user indicating that the at least one graphical indicator is to be displayed in absence of the silhouette.

In one embodiment, the at least one graphical indicator comprises one or more of the following:
- a time indicator indicating the time at the remote location and/or the user's local side,
- a date indicator indicating the date at the remote location and/or the user's local side,
- a weather condition indicator indicating the weather condition of the remote location,
- a location related indicator indicating the remote location,
- a financial indicator indicating the financial condition for the user at the remote location,
- a social indicator indicating the social conditions for the user at the remote location, and
- a mood indicator indicating the mood of the user at the remote location.

In one embodiment, the method further comprises displaying multiple graphical indicators to the user and receiving a selection command from the user indicating which of the displayed graphical indicators to be incorporated in the silhouette image.

Accordingly, a user friendly way/interface is provided where the user can select which graphical indicators are to be incorporated in the silhouette image.

According to another aspect, the present invention relates to a computer program product for instructing a processing unit to execute the above mentioned method steps when the product is run on a computer.

According to still another aspect, the present invention relates to a system for silhouette image representation of a subject located at a remote location, comprising:
- a receiving unit for receiving input data relating to the remote location,
- obtaining means for obtaining at least one graphical indicator indicating graphically at least one local condition at the remote location based on the received input data, and
- a processor for incorporating the at least one graphical indicator in the silhouette image.

The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
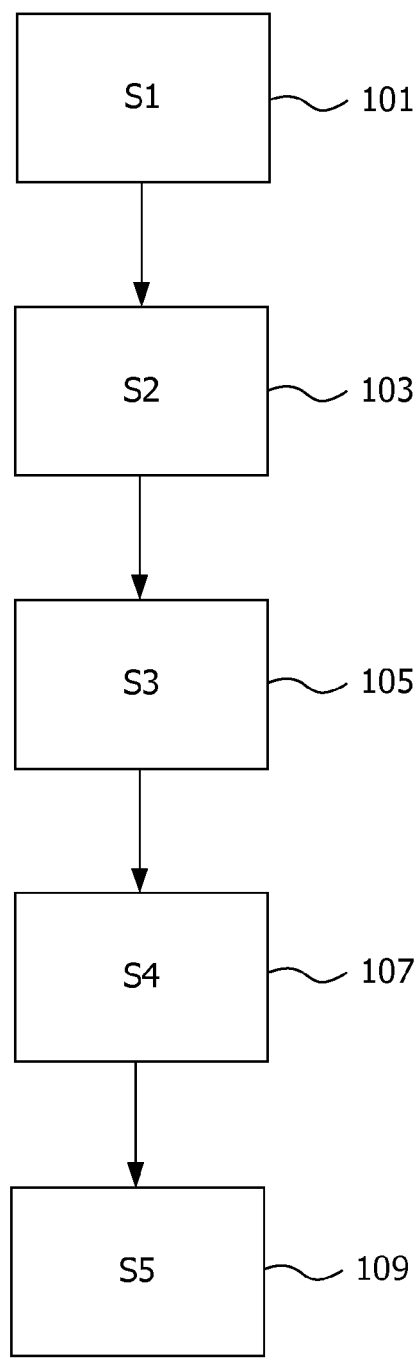
FIG. 1 shows a flowchart of a method according to the present invention.

FIG. 1 shows a flowchart of a method according to the present invention of silhouette image representation of a subject located at a remote location.

In step (S1) 101, an input data relating to the remote location is received, where the received input data may include the time at a local user's side, the time at the remote location side, data indicating the actual date, geographical data of the remote location and the like. It should be noted that this list is not exhaustive. These data may be manually entered by a user or these data may e.g. be requested automatically by the computer at the user's local side.

In step (S2) 103, at least one graphical indicator indicating graphically at least one local condition at the remote location is obtained based on the received input data is obtained.

In step (S3) 105, the at least one graphical indicator is incorporated in the silhouette image.

In one embodiment, this step of obtaining is done at the local user's side where based on said data relating to the remote location the at least one graphical indicator is extracted. As an example, the memory at the user's local side may have stored a number of different icons, e.g. cloudy whether, clear sky, fog, raining etc. Said data relating to the remote location may thus be transmitted from external service agents as a response to a request from the user's side, where the request contains data that identify the remote location. The external service agents may as an example include weather service agent which supplies weather related information at the remote location, or a finance service agent which supplies finance related information at the remote location, or a social service agent which supplies social related information at the remote location. These data are then received at e.g. the user's PC computer, which converts the data relating to the remote location (e.g. data indicating that it is raining at the remote location) into the appropriate graphical indicator. As an example, if the received data is time and the time shows that it is night at the remote location, the graphical indicator might appear as a dark background image or as the moon. These service agents might, instead of transmitting the data relating to the remote location, transmit said graphical indicator (icons). The user's PC computer might then instead incorporate the received icon into the silhouette image.

As another example, the data relating to the time (at the local user's side or the remote location) may be used to supply a time-of-day indication (e.g. sun/moon dial or lighting characteristic) in the silhouette image based solely on the local time at the remote person's location. This local time of the remote location could be kept by means of an internal clock that is once set by the user. Alternatively, the user once enters a time-offset for the remote friend's location relative to his own local time. The user might also enter his location and his remote friend's location, after which the system determines the time difference from a simple look-up table.

The step of obtaining said at least one graphical indicator is in one embodiment based on a set of rules which link the input data relating to the remote location to the graphical indicator to be displayed. This may be based on a look-up table which links the input data relating to the remote location to the graphical indicator to be displayed.

In one embodiment, the input data relating to the remote location is issued by remote service agents as a response to an input command received from the user, where the input command includes data which in one way or another identifies the remote location. Accordingly, this could be the case where the user enters the country/city code or name of the city at the remote location where this data is subsequently sent to e.g. an external server. As an example, a user is chatting with his partner which staying in another country (e.g. via "facebook"), where the image of the remote person is displayed as a silhouette image. By entering e.g. the city code information, these are transmitted to one or several external servers, which receive them and respond by e.g. transmitting the one or more data relating to the remote location back to the user's local device.

In another embodiment, the data relating to the remote location is issued at a remote location as a response to a requesting command received from the user requesting to display the silhouette image or when starting a software program containing such a silhouette image. Accordingly, when chatting to a given remote person via "facebook", information is issued relating to where this remote person is actually located. The information could have been manually entered by the remote person. When starting to chat to this remote person, these data relating to the remote location are transmitted to e.g. said weather server, finance server etc, which respond to the received data and provide the data relating to the remote location. As an example, the finance server could issue a finance data or some kind of a finance indicator—indicating whether the stock market is on the way up/down.

The step of incorporating the at least one graphical indicator in the silhouette image includes adding the at least one graphical indicator onto an existing silhouette image which acts as a background image, or put in other words, to superimpose a second image which is the graphical indicator onto a first image which is the silhouette image. Thus, a new silhouette image is not made, but instead these graphical indicators are simply added to the silhouette image, e.g. for rain, one could display a dot like pattern surrounding the silhouette, or for fog, one could do a grayish surrounding of the silhouette, or for cloudy occasions, one could display a few cloud icons, or for wind, one could let the clouds move with a certain speed.

In another embodiment, the step of incorporating the at least one graphical indicator in the silhouette image includes generating a silhouette image comprising the at least one graphical indicator. Thus, in a way a new silhouette image is made each time the remote conditions change.

In step (S4) 107, the method further comprises the step of displaying multiple graphical indicators to the user and receiving a selection command from the user indicating which of the displayed graphical indicators to be incorporated in the silhouette image. Accordingly, the user can customize his silhouette image representation by specifying whether he e.g. wants to include e.g. a time indicator indicating the time at the remote location and/or the user's local side, a date indicator indicating the date at the remote location and/or the user's local side, a weather condition indicator indicating the weather condition of the remote location, a financial indicator indicating the financial condition for the user at the remote location, a social indicator indicating the social conditions for the user at the remote location, a mood indicator indicating the mood of the user at the remote location and the like.

In step (S5) 109, the method further comprises the step of receiving a command from the user indicating that the at least one graphical indicator is to be displayed in absence of the silhouette.

Figure 2A:
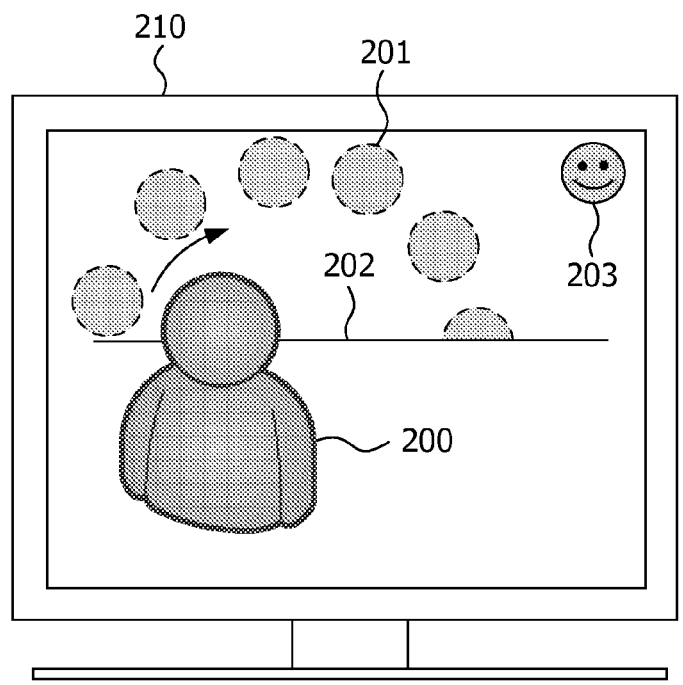
FIG. 2a-b shows examples of a silhouette image representation of a subject located at a remote location.

FIG. 2a shows one example of a silhouette image representation of a subject located at a remote location, where the silhouette image 200 is displayed on a computer screen 210. This may just as well be a screen on a portable computer device such as a mobile phone and the like.

The graphical indicator as shown here is a circular-shaped icon 201 indicating the sun (a sun-like silhouette) and the horizontal line icon 202 may indicate the horizon. The time of the day may as shown here be indicated by the position of the sun 201 where said look-up table might be adapted to associate the time at the remote location to the position of the circular-shaped icon so as to animate the sun rising above the horizon within the silhouette image area (the traveling path of the sun is indicated by the arrow). The sun-like silhouette is thus shown as a function of time, where the position of the icon is varied in a semi-circle from to the left close to the horizon, to mid above horizon to right close to the horizon. All these set of rules may be defined in said look-up table which links the time of the day at the remote location to the position of the sun in the silhouette image.

As depicted here, a graphical mood indicator is also displayed 203 indicating that the subject at the remote location is happy. This mood indicator may be obtained from an external service provider that has e.g. provided some data about the subject at the remote location (e.g. the subject has received a job), or this graphical mood indicator is displayed in conjunction with the nice weather indicating that this subject can only be happy at this time. This mood indicator may also indicate that the exams at the university have just been completed (external service is the university calendar which shows that the exams period is over). Also, in the case that the application is an MSN-like service, the mood information could of course also come from the remote user himself (e.g. mobile Phone, PDA and the like), since in that case a data connection is present anyway.

Figure 2B:
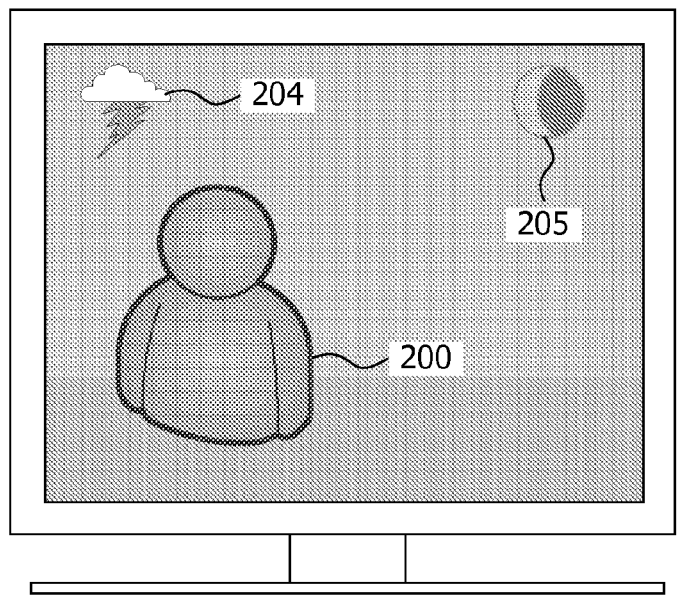

FIG. 2b depicts graphically the scenario where the time indicator shows that it is late evening or night at the remote location, depicted via a moon indicator 205 and the grayish background color. Also, the information from the weather service agent (via remote location indicator or graphical indicator) indicates via the cloud icon 204 that there are also lightning's. This icon for the weather condition may be collected from a dedicated server or existing weather stations. As another example, the graphical indicator for rain may be to display a dot like pattern surrounding the silhouette, or for fog one could do a grayish surrounding of the silhouette, or for wind one could let the clouds move with a certain speed (not shown here).

As another example, for the environment one may display geographical data in an icon style, e.g. in a mountainous area an image of a mountain could be superimposed, or close to sea a wave-like icon could superimposed, or for a desert the image of a cactus could be superimposed, etc. Also, to give the impression of a village (e.g. population less than 50.000 in at the remote location area), an impression of a village might be provided by adding an icon of few houses, or a city (e.g. if the population at the remote location is more than 500.000) by adding an icon showing (a skyline with) sky scrapers.

Further examples of indicating the remote location could be use include using a location related indictor which is characteristic for the city/country where the remote subject is located, e.g. an icon of the Eiffel tower (Paris), statue of liberty (New York), windmill (Holland) etc.

All these additional data may in one embodiment be considered as secondary and should preferably not be displayed such that it attracts the attention. Furthermore, the several possibilities above could, in principle, be done separately or on top of each other, or be chosen by the user.

Figure 3:
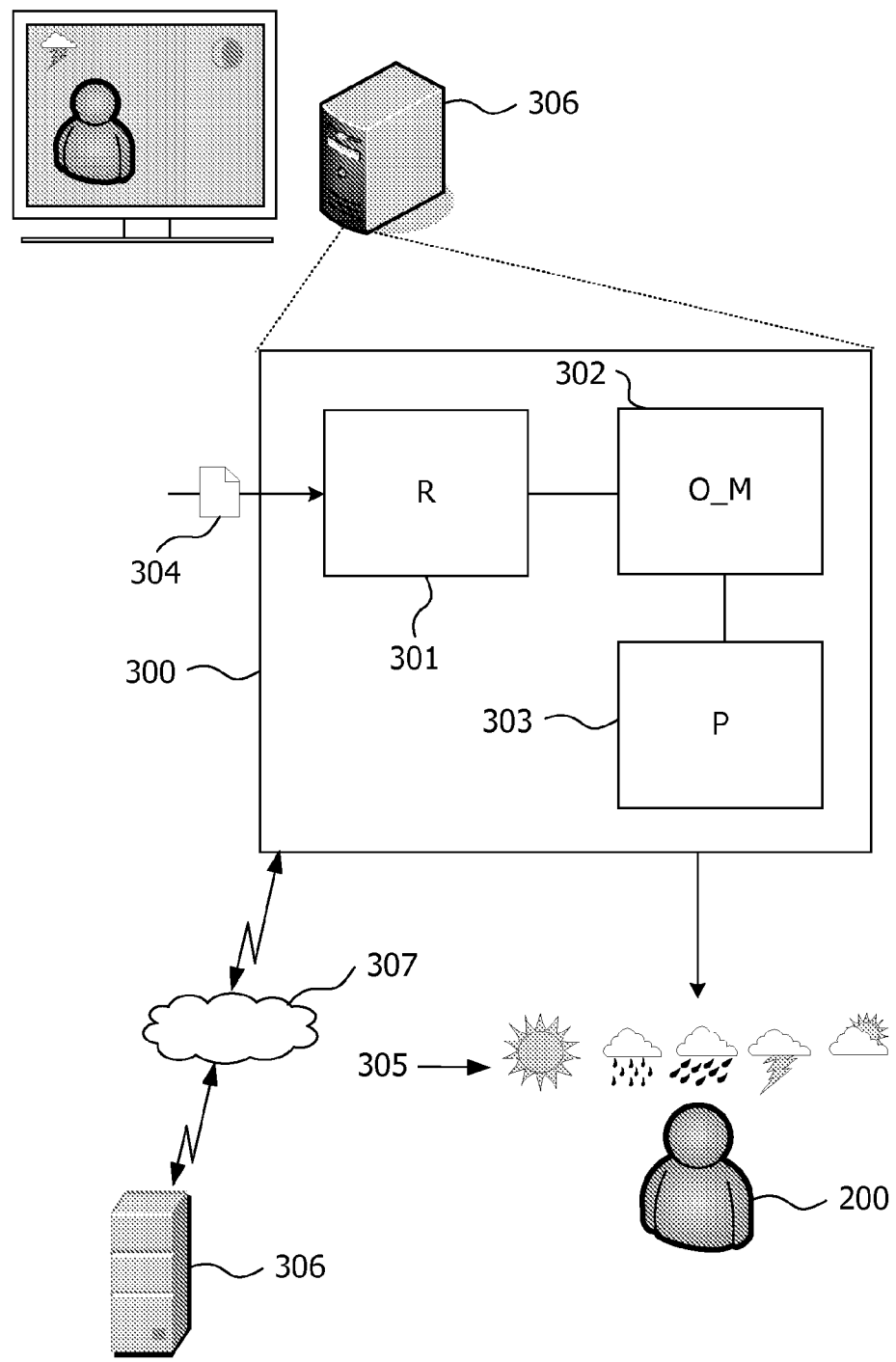
FIG. 3 shows a system according to the present invention for silhouette image representation.

FIG. 3 shows a system 300 according to the present invention for silhouette image representation of a subject located at a remote location, comprising a receiving unit (R) 301 for receiving input data 304 relating to the remote location, obtaining means (O_M) 302 for obtaining at least one graphical indicator 305 indicating graphically at least one local condition at the remote location based on the received input data, and a processor (P) 303 for incorporating the at least one graphical indicator 305 in the silhouette image.

The receiving unit (R) 301 may be an input unit such as a keyboard for receiving keyboard commands from the user regarding said input data, or a speech recognition system for receiving said data via speech command, or mouse for receiving said data via a mouse command(s) and the like. Also, in case the application includes a data connection to the remote user (e.g. MSN), the receiving unit may also include a receiver that receives the required information from the remote user' device, or, in the case of geographical location, simply from the remote user's IP address.

The obtaining means (O_M) 302 may as an example include a processor for extracting from e.g. a memory the appropriate graphical indicators based on the received input data. The obtaining means (O_M) 302 may also include a receiver which receives the graphical indicators from external service providers 306 such as a weather service provider, financial service provider etc (see under FIG. 1) via a wired or wireless communication channel 307. The processor (P) is adapted to incorporating the at least one graphical indicator in the silhouette image, where the incorporating include incorporating the at least one graphical indicator in the silhouette image. These one or more graphical indicators may in one embodiment be considered as secondary data and should preferably not be displayed such that it attracts the attention.

The system may be comprised at the local user's side in e.g. PC computer 306 or any type of device with a display such as a portable computer comprising a display screen, or mobile phone, digital photo frame and the like. The processing steps may just as well be performed externally where the silhouette image along with the one or more graphical indicator is received at the local user's side.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. A method of silhouette image representation of a subject located at a remote location, comprising:
   receiving input data relating to the remote location;
   obtaining at least one graphical indicator based on the received input data, wherein the at least one graphical indicator is configured to indicate graphically at least one local condition at the remote location, wherein obtaining the at least one graphical indicator based on the received input data comprises (i) requesting external service agents for condition related data for the remote location, and (ii) converting the condition related data into said at least one graphical indicator; and
   incorporating the at least one graphical indicator in a shadow theatre display of the silhouette image representation of the subject located at the remote location, wherein incorporating the at least one graphical indicator in the silhouette image representation of the subject located at the remote location includes adding, as a background image, the at least one graphical indicator onto an existing silhouette image, wherein the at least one graphical indicator, as the background image, is rendered to be persistent and non-obtrusive in the shadow theatre display,
   wherein the received input data include one or more data selected from:
     time at a local user's side,
     time at a remote location side,
     data indicating an actual date, and
     geographical data of the remote location;
   wherein the step of obtaining at least one graphical indicator is performed at the local user's side where said received input data is used as an input in creating said at least one graphical indicator; and
   wherein creating said at least one graphical indicator is based on a set of rules which link the received input data relating to the remote location to the graphical indicator to be displayed.

2. The method according to claim 1, wherein said set of rules is a look-up table which links the received input data relating to the remote location to the graphical indicator to be displayed.

3. The method according to claim 1, wherein the set of rules at least uses the received input data as an input variable where the output of the rules is the at least one graphical indicator to be displayed.

4. The method according to claim 1, wherein the external service agents are selected from:
   a weather service agent which supplies weather related information at the remote location or which supplies said graphical indicator indicating graphically the weather related information, or a finance service agent which supplies finance related information at the remote location or which supplies said graphical indicator indicating graphically the financial situation at the remote location, or a social service agent which supplies social related information at the remote location or which supplies said graphical indicator indicating graphically the social situation at the remote location.

5. The method according to claim 1, wherein the received input data relating to the remote location is issued by remote service agents as a response to an input command received from a user, where the input command includes data identifying the remote location, or a requesting command received from the user requesting to display the silhouette image representation of the subject at the remote location or when starting a software program containing such a silhouette image representation of the subject at the remote location.

6. The method according to claim 1, wherein the at least one graphical indicator is received at a local user side as a separate data stream.

7. The method according to claim 6, further comprising receiving a command from the a user indicating that the at least one graphical indicator is to be displayed in absence of the silhouette.

8. The method according to claim 1, wherein the at least one graphical indicator further comprises a mood indicator indicating a mood of the user at the remote location.

9. A non-transitory computer-readable storage medium encoded with a computer program for instructing a processing unit to execute the method of claim 1 when the computer program is run on the processing unit.

10. A system for silhouette image representation of a subject located at a remote location, comprising:

a receiving unit configured to receive input data relating to the remote location;

a processor configured to obtain at least one graphical indicator based on the received input data, wherein the at least one graphical indicator is configured to indicate graphically at least one local condition at the remote location; and a processor for incorporating the at least one graphical indicator in a shadow theatre display of the silhouette image representation of the subject located at the remote location, wherein incorporating the at least one graphical indicator in the silhouette image representation of the subject located at the remote location includes adding, as a background image, the at least one graphical indicator onto an existing silhouette image, and wherein the at least one graphical indicator, as the background image, is rendered to be persistent and non-obtrusive in the shadow theatre display, wherein the received input data include one or more data selected from:

time at a local user's side, time at a remote location side, data indicating an actual date, and geographical data of the remote location;

wherein obtaining at least one graphical indicator is performed at the local user's side where said received input data is used as an input in creating said at least one graphical indicator; and wherein creating said at least one graphical indicator is based on a set of rules which link the received input data relating to the remote location to the graphical indicator to be displayed.

11. A method of silhouette image representation of a subject located at a remote location, comprising:

receiving input data relating to the remote location;

obtaining at least one graphical indicator based on the received input data, wherein the at least one graphical indicator is configured to indicate graphically at least one local condition at the remote location; and incorporating the at least one graphical indicator in a shadow theatre display of the silhouette image representation of the subject located at the remote location, wherein the step of incorporating the at least one graphical indicator in the silhouette image representation of the subject located at the remote location includes adding, as a background image, the at least one graphical indicator onto an existing silhouette image, and wherein the at least one graphical indicator, as the background image, is rendered to be persistent and non-obtrusive in the shadow theatre display, wherein the received input data include one or more data selected from:

time at a local user's side, time at a remote location side, data indicating an actual date, and geographical data of the remote location;

wherein the step of obtaining at least one graphical indicator is performed at the local user's side where said received input data is used as an input in creating said at least one graphical indicator; and wherein creating said at least one graphical indicator is based on a set of rules which link the received input data relating to the remote location to the graphical indicator to be displayed.

12. The method according to claim 11, wherein the received input data relating to the remote location is issued by remote service agents as a response to (i) a requesting command received from a user requesting to display the silhouette image representation of the subject at the remote location or (ii) when starting a software program containing such a silhouette image representation of the subject at the remote location.

* * * * *